(12) United States Patent
Kessler et al.

(10) Patent No.: US 7,761,118 B1
(45) Date of Patent: *Jul. 20, 2010

(54) DATABASE PROGRAMS FOR HANDHELD DEVICES

(75) Inventors: Dirk Kessler, San Francisco, CA (US); Lee McIntyre, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 11/285,859

(22) Filed: Nov. 22, 2005

Related U.S. Application Data

(63) Continuation of application No. 10/099,317, filed on Mar. 15, 2002, now Pat. No. 7,003,260.

(60) Provisional application No. 60/355,731, filed on Feb. 4, 2002.

(51) Int. Cl.
*H04M 1/00* (2006.01)
(52) U.S. Cl. ........................... 455/566; 709/219
(58) Field of Classification Search ................ 455/552, 455/414.4, 432.2, 413, 566; 709/219
See application file for complete search history.

(56) References Cited

U.S. PATENT DOCUMENTS

| 6,539,237 | B1 | 3/2003 | Sayers et al. |
| 6,714,778 | B2 | 3/2004 | Nykanen et al. |
| 6,721,578 | B2 * | 4/2004 | Minear et al. ............... 455/566 |
| 6,785,562 | B2 * | 8/2004 | Lee et al. ..................... 455/566 |
| 7,035,620 | B2 * | 4/2006 | Ben-Efraim et al. ...... 455/412.1 |
| 7,092,740 | B1 * | 8/2006 | Chi ............................ 455/566 |
| 7,203,721 | B1 * | 4/2007 | Ben-Efraim et al. ........ 709/203 |
| 2001/0034746 | A1 * | 10/2001 | Tsakiris et al. .............. 707/517 |
| 2001/0053685 | A1 * | 12/2001 | Mori et al. .................. 455/411 |
| 2002/0098864 | A1 * | 7/2002 | Mukai et al. ................ 455/552 |
| 2002/0103908 | A1 | 8/2002 | Rouse et al. |

* cited by examiner

*Primary Examiner*—Tu X Nguyen
(74) *Attorney, Agent, or Firm*—Beyer Law Group LLP

(57) ABSTRACT

Techniques for providing access to databases from handheld devices are disclosed. Techniques can be used to implement a database system. The database system provides a graphical user interface which can be displayed on handheld devices. This allows users of handheld devices to conveniently by interacting with the graphical user interface. As will be appreciated, the user can access the database to perform a variety of operations. Moreover, the user can perform these operations without having to write programs and virtually in real time. Thus, the user can conveniently access the database and be provided with up-to-date information. In addition, the user can be provided with hyperlinks which allow the user to conveniently perform various tasks without having to switch between different operation modes.

18 Claims, 9 Drawing Sheets

DATABASE PROGRAMS FOR HANDHELD DEVICES

CROSS-REFERENCE TO RELATED APPLICATIONS

This is a continuation application of and claims priority under 35 U.S.C. §120 to commonly owned and U.S. application Ser. No. 10/099,317, entitled "DATABASE PROGRAMS FOR HANDHELD DEVICES," filed on Mar. 15, 2002, now U.S. Pat. No. 7,003,260 which claims the benefit of U.S. Provisional Application No. 60/355,731, filed Feb. 4, 2002, and entitled "DATABASE PROGRAMS FOR REMOTE DEVICES," each of which is hereby incorporated by reference herein in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to databases and, more particularly, to database programs capable of accessing databases.

2. Description of the Related Art

Databases are used to store data in a manner that facilitates subsequent use of the data. A database includes one or more files, each of which contain one or more records. A record holds information about a subject or item in its various fields.

To allow a user to more easily access and manage data stored in databases, database programs have recently been developed. Database programs, among other things, often provide a user interface which allows the user to conveniently interact with the database program. By interacting with the user interface, the user of the database can perform various operations on the data stored in the database. The interface provided by the database program is typically a Graphical User Interface which allows the user to conveniently interact with the database program and, in turn, with the database. The user may interact with the graphical user interface to, for example, view the data in various ways. The visual representations provided to the user can include, for example, a browse mode. The browse mode allows records to be viewed, changed, sorted, deleted, or added.

FIG. 1 is a representative screen depiction from a conventional database program, namely, FileMaker Pro 4.0 by FileMaker Pro, Inc. of Santa Clara, Calif. The screen depiction pertains to an asset management database having three records. A browse mode for the first record of the asset management database is depicted. The browse mode is suitable for on-line or screen viewing of the records of the asset management database and allows the records to be viewed or deleted. The data in the fields of the record can be changed, sorted, deleted or added in the browse mode.

Accordingly, a database program provides the user with the ability to conveniently access databases. Unfortunately, however, conventional database programs typically require a desktop computer to operate. In some cases, handheld devices (e.g., remote wireless phones) can be used to access a database, but this typically requires some programming (e.g., writing scripts). Furthermore, another problem is that the conventional techniques typically require the user to switch between different modes to perform everyday tasks. For example, the user may use a remote wireless phone to find a phone number stored in a database, but there is no convenient way for the user to place a call to that phone number. Typically, the user has to write down the phone number and switch to the phone mode before the call can be placed.

In view of the foregoing, there is a need for database programs which can operate on handheld devices.

SUMMARY OF THE INVENTION

Broadly speaking, the invention relates to techniques for providing access to databases from handheld devices. In accordance with one aspect of the invention, a database system is disclosed. The database system provides a graphical user interface which is displayed on handheld devices. This allows users of handheld devices to conveniently by interacting with the graphical user interface. As will be appreciated, the user can access the database to perform a variety of operations. Moreover, the user can perform these operations without having to write programs and virtually in real time. Thus, the user can conveniently access the database and be provided with up-to-date information. In addition, the user can be provided with hyperlinks which allow the user to conveniently perform various tasks without having to switch between different operation modes.

The invention can be implemented in numerous ways, including as a method, an apparatus, a computer readable medium, and a database system. Several embodiments of the invention are discussed below.

As a database program one embodiment of the invention is capable of accessing at least one database capable of having one or more records stored therein; and communicating with a handheld device. This allows the at least one database to be accessed from the handheld device through the database program.

As a method for providing a handheld device with access to a database, one embodiment of the invention includes the acts of: receiving a request from a handheld device to access a database capable of having one or more records stored therein; determining whether the request should be granted; accessing the database when it is determined that the request should be granted; and displaying information relating to the database on the handheld device.

As a database system, one embodiment of the invention includes: a database capable of having one or more records stored therein; a database program capable of accessing the database; and an interface capable of communicating with a handheld device and the database program, thereby allowing the handheld device to access the database.

As a computer readable medium, one embodiment of the invention includes computer program code for a database system. The database system includes a database capable of having one or more records stored therein; a database program capable of accessing the database; and an interface capable of communicating with a handheld device and the database program, thereby allowing the handheld device to access the database.

The advantages of the invention are numerous. Different embodiments or implementations may yield one or more of the following advantages. One advantage of the invention is that database operations can conveniently be performed using a handheld device by interacting with a graphical user interface which is displayed on the handheld device. Another advantage of the invention is that the user can perform various tasks without having to switch between different operational modes. Still another advantage is that the invention can be implemented to operate using existing database programs and conventions. Yet another advantage of the invention is that users of handheld devices can be provided with up-to-date database information.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background of the invention, there is a need for database programs which can provide users of handheld devices with the ability to access data from a database. Accordingly, the invention pertains to techniques for providing access to databases from handheld devices. In accordance with one aspect of the invention, a database system is disclosed. The database system provides a graphical user interface which is displayed on handheld devices. This allows users of handheld devices to conveniently by interacting with the graphical user interface. As will be appreciated, the user can access the database to perform a variety of operations. Moreover, the user can perform these operations without having to write programs and virtually in real time. Thus, the user can conveniently access the database and be provided with up-to-date information. In addition, the user can be provided with hyperlinks which allow the user to conveniently perform various tasks without having to switch between different operation modes.

Embodiments of these aspects of the invention are discussed below with reference to FIGS. 2-9. However, those skilled in the art will readily appreciate that the detailed description given herein with respect to these figures is for explanatory purposes as the invention extends beyond these limited embodiments.

Figure 1:
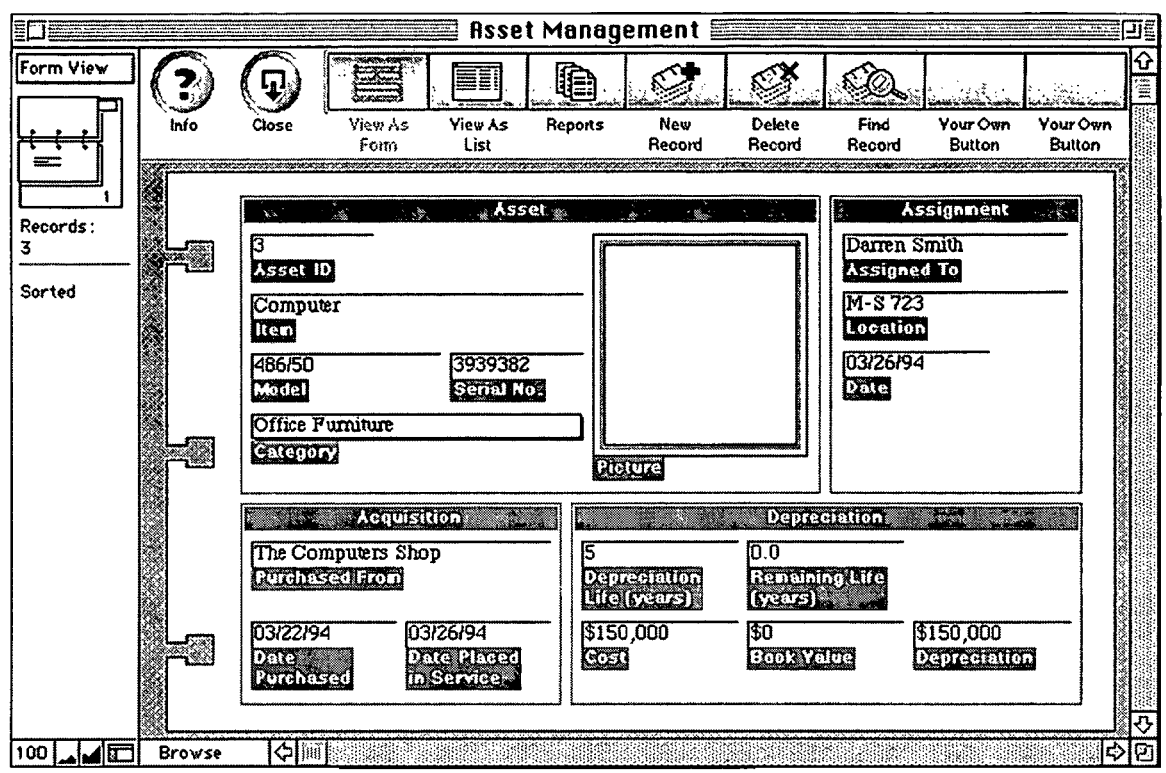
FIG. 1 is a representative screen depiction from a conventional database program.
Figure 2:
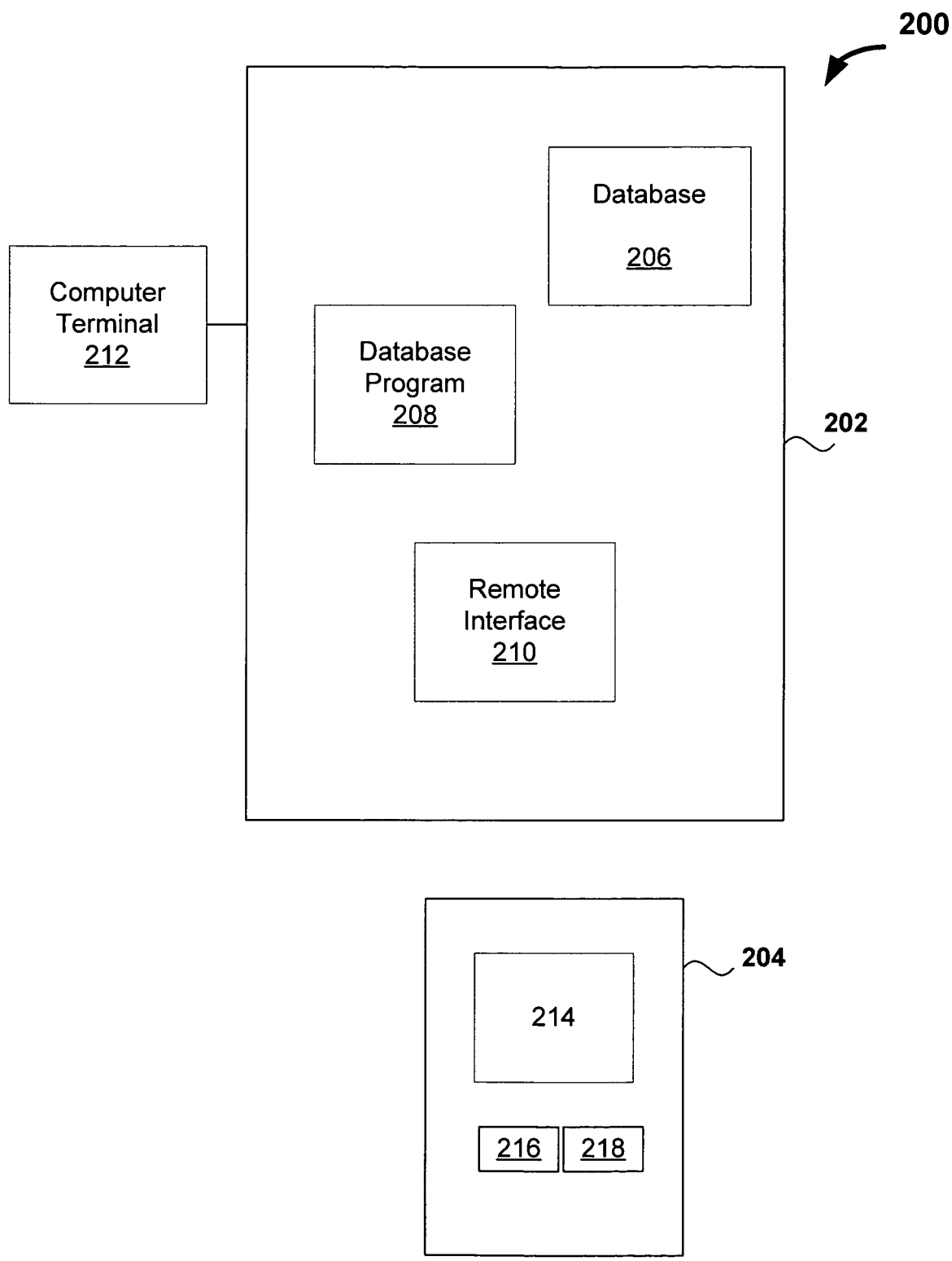
FIG. 2 illustrates a communication environment in accordance with one embodiment of the invention.

FIG. 2 illustrates a communication environment 200 in accordance with one embodiment of the invention. The communication environment 200 includes a database system 202 and a remote handheld device 204. As shown in FIG. 2, the database system 202 includes a database 206, a database program 208, and a remote interface 210. The database 206 can be used to store data in a manner that facilitates subsequent use of the data. The database program 208 provides a user interface which allows the user to conveniently interact with the database 206. The database program 208 can provide similar functionality as provided by the conventional database programs. As such, similar to conventional database programs, a computer terminal 212 can be used to access the database 206 through the database program 208. The database program 208 can, for example, be a FileMaker Pro database program produced by FileMaker Pro, Inc. of Santa Clara, Calif.

Moreover, the remote handheld device 204 can also access the database 206. Typically, the remote handheld device 204 uses the remote interface 210 in order to access the database program 208. The database program 208 can, in turn, access the database 206 and relay information back to the remote interface 210 which can pass the information back to the remote handheld device 204. It should be noted that the remote handheld device 204 can, for example, be a wireless phone which uses a telecom server to communicate with the database program 208. The telecom server can, for example, use an HTTP protocol while the wireless phone is an "imode" compatible device.

The database program 208 and/or remote interface 210, for example, can be running on a server. The remote interface 210, among other things, can convert the data it receives from the database program 208. The data can be converted (e.g., compacted) and then presented to the remote handheld device 204 for display. As will be appreciated, the user can conveniently access data by interacting with a graphical user interface which is presented to the user on a display 214 of the remote handheld device 204. Inputs 216 and 218 are provided to allow the user to interact with the graphical user interface. As will be appreciated, the user can access the database without having to write programming code (e.g., scripts).

Figure 3:
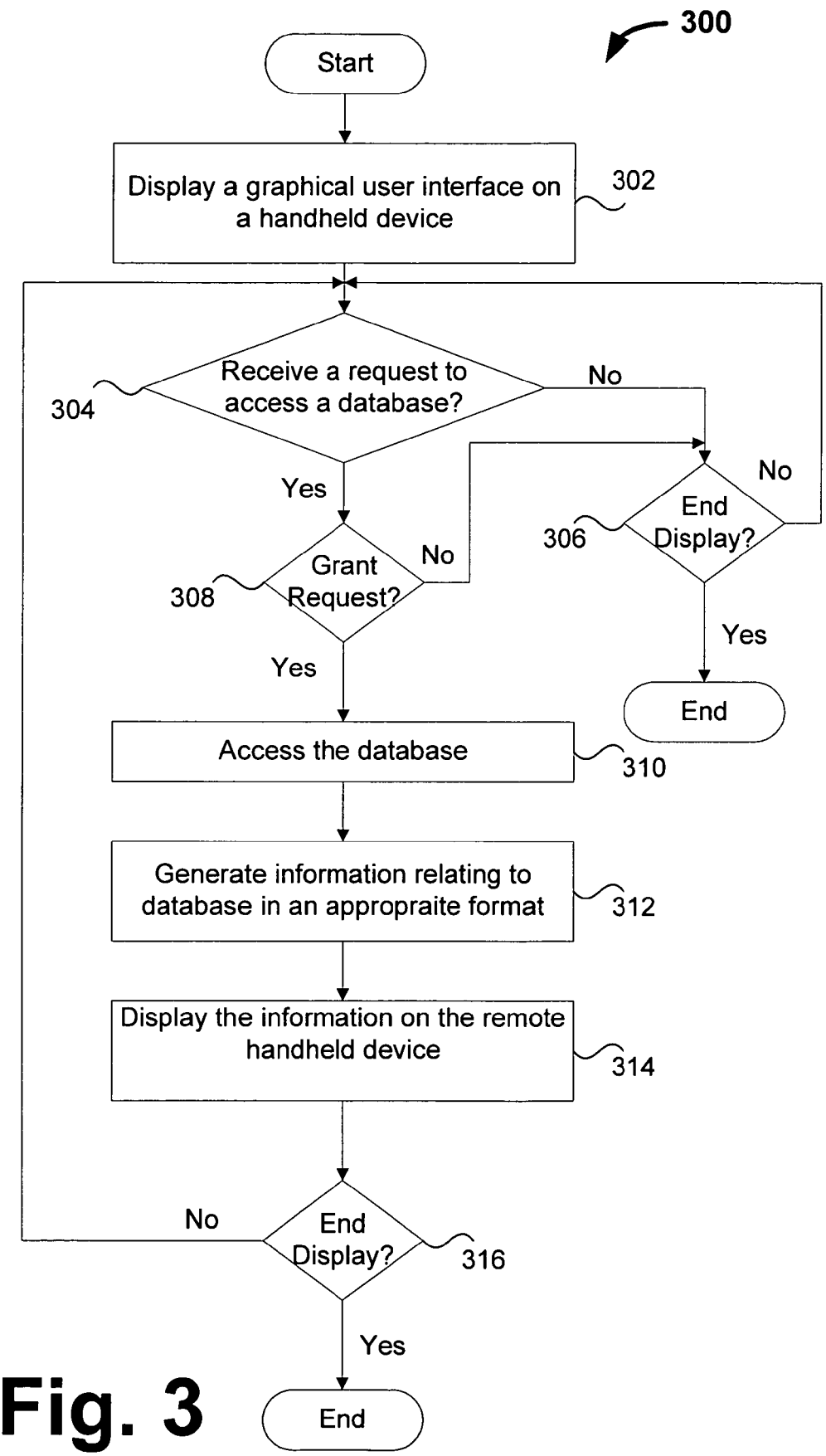
FIG. 3 illustrates a method for providing access to a database from a handheld device in accordance with one embodiment of the invention.

FIG. 3 illustrates a method 300 for providing access to a database from a handheld device in accordance with one embodiment of the invention. The method 300 can, for example, be implemented in the communication environment 200 of FIG. 2. Initially, at operation 302, a graphical user interface is displayed on the handheld device (e.g., handheld device 204 of FIG. 2). Next, at operation 304, a determination is made as to whether a request to access the database has been received. Typically, a user of the handheld device can interact with the graphical user interface in order to submit a request to access a database.

If it is determined at operation 304 that a request to access the database has not been received, the method 304 proceeds to operation 306 where it is determined whether a request to end display of the graphical user interface had been received. If it is determined at operation 306 that a request to end the display of the graphical user interface has been received, the method 300 ends. However, if it is determined at operation 306 that a request to end the display of the graphical user interface has not been received, the method 300 proceeds to operation 304 where it is determined whether a request to access the database has been received.

On the other hand, if it is determined at operation 304 that a request to access the database has been received, the method 300 proceeds to operation 308, where a determination is made as to whether the request to access the database should be granted. If it is determined at operation 308 that the request should not be granted, the method 300 proceeds to operation 306 where it is determined whether a request to end the display of the graphical user interface has been received. However, if it is determined at operation 308 that the request to access the database should be granted, the method 300 proceeds to operation 310 where the database is accessed.

Next, at operation 312, information relating to the database is generated in a format which is appropriate for the handheld device. As will be appreciated, the information can, for example, be compacted in a compact HTML and the like. In any case, at operation 314, the information relating to the database is displayed on the handheld device. Thereafter, the method 300 proceeds to operation 316 where it is determined whether a request to end the display of the graphical user interface has been received. If it is determined at operation 316 that a request to end the display of the graphical user interface has not been received, the method 300 proceeds to operation 304 where it is determined whether a request to access the database has been received. However, if it is determined at operation 316 that a request to end the display of the graphical user interface has been received, the method 300 ends.

Figure 4:
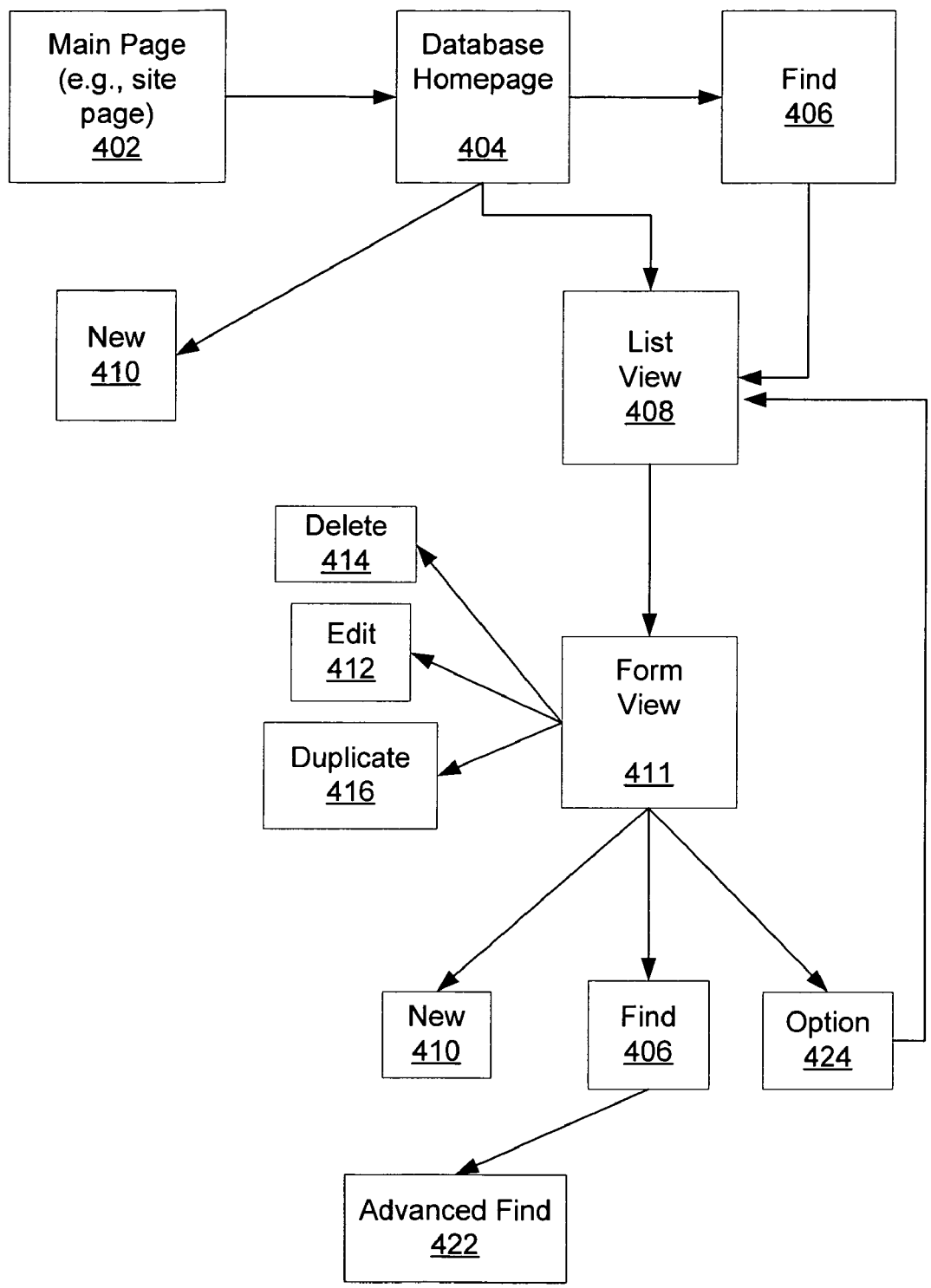
FIG. 4 illustrates a graphical user interface which can be provided in accordance with one embodiment of the invention.

FIG. 4 illustrates a graphical user interface which can be provided in accordance with one embodiment of the invention. Initially, a main page (e.g., site page) 402 is displayed. As will be appreciated, the main page 402, among other things, can list various databases that are available to the user. Accordingly, the user can select one or more of the databases displayed at the main page 402. The user can conveniently select a database by interacting with the graphical user interface. When a database is selected, the user is presented with a corresponding database homepage 404. The database homepage 404, among other things, can provide the user with various options including a "find" option 406, a "list" option 408 and a "new" option 410.

From the list option 408, the user can select a "form view" option 411 which, among other things, provides the user with hypertext links (e.g., URLs, phone numbers, etc.). As will be appreciated, the user can conveniently use these hyperlinks to perform a variety of tasks (e.g., access a website, send an email, make a phone call, etc.). In addition, from the form view option 411 the user can use the functions of "edit" 412, "delete" 414, "duplicate" 416, "new" 418 and "find" 420 to perform a variety of tasks on records stored in a database. These options can be implemented to perform similar tasks as those provided by a database program which operates on a desktop computer (e.g., database program 208 of FIG. 2). It should be noted that an advanced find option 420 can also be made available to user. It should also be noted that the browse option 424 can be implemented to take the user back to the list option 408.

Figures 5A, 5B:
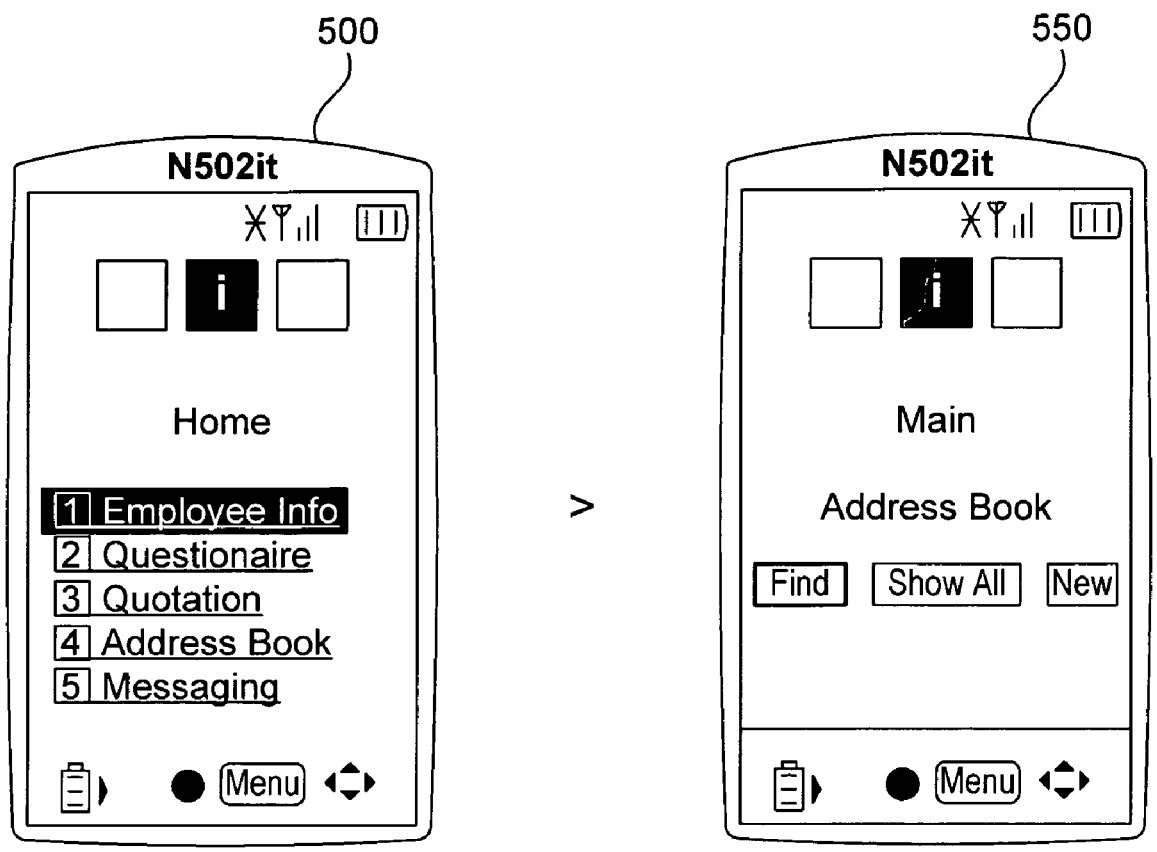
FIG. 5 illustrates an exemplary main page in accordance with one embodiment of the invention.

As noted above, the main page 402 of FIG. 4 can list various databases that are available to the user. FIG. 5 illustrates an exemplary main page 500 in accordance with one embodiment of the invention. As shown in FIG. 5A, the exemplary main page 500 can provide a list of databases which are available to the user, namely, employee info, questionnaire, quotation, address book, and messaging databases. As will be appreciated, each of these databases can be associated with a numerical digit (i.e., 0-9). This allows the users to conveniently select a database by pressing a number. Accordingly, the user of relatively small handheld devices do not need to scroll a cursor (i.e., continually press a scroll up and/or down button to move a cursor). In addition, the user can also be provided with a "next" and "previous" button. Again, this allows the user to view the list of available of databases without having to scroll a cursor.

FIG. 5B illustrates an exemplary database homepage 550 in accordance with one embodiment of the invention. The database homepage 550 corresponds to the "address book" database shown in FIG. 5A. In other words, when the user selects the address book database shown in FIG. 5A, the database homepage 550 can be displayed. It should be noted that the database homepage 550 includes various operations that can be performed on the address book database, namely, "find," "show all" and "new."

Figure 6:
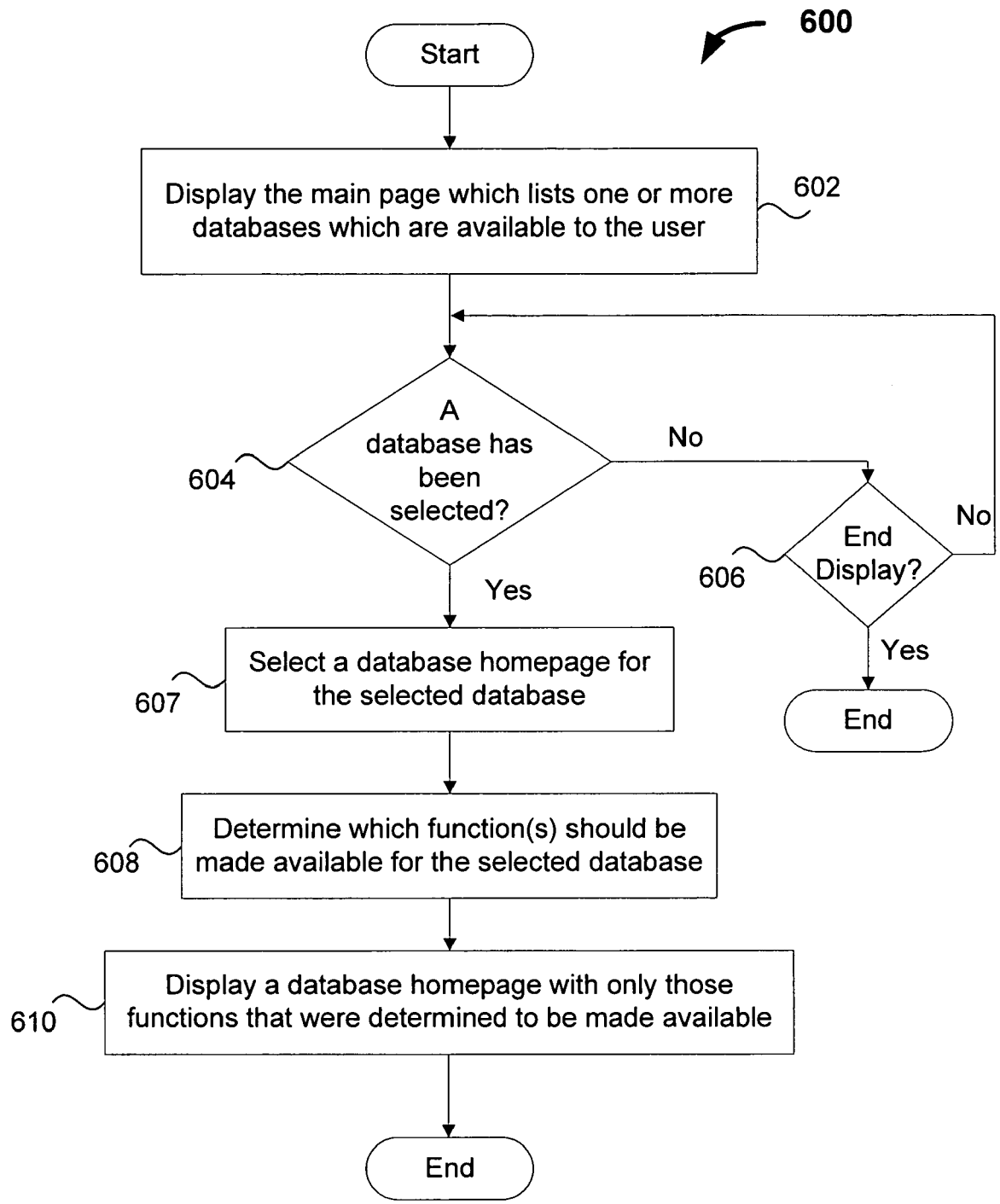
FIG. 6 illustrates a method for displaying a graphical user interface in accordance with one embodiment of the invention.

FIG. 6 illustrates a method 600 for displaying a graphical user interface in accordance with one embodiment of the invention. Initially, at operation 602, a main page is displayed. The main page lists one or more database which are available to the user. Next, at operation 604, a determination is made as to whether a database has been selected. If it is determined at operation 604 that a database has not been selected, the method 600 proceeds to operation 606 where it is determined whether the display of the graphical user interface should end. If it is determined at operation 606 that the display of the graphical user interface should end, the method 600 ends. However, if it is determined at operation 606 that the display of the graphical user interface should not end, the method 600 proceeds to operation 604 where a determination is made as to whether a database has been selected.

If it is determined at operation 604 that a database has been selected, the method 600 proceeds to operation 607 where a database homepage is selected for the database. Next, at operation 608, it is determined which functions should be made available for (i.e., are applicable to) the selected database. Thereafter, at operation 610, a database homepage with only those functionalities that were determined to be applicable to the database is displayed. The method 600 ends following operation 610.

Figure 7A:
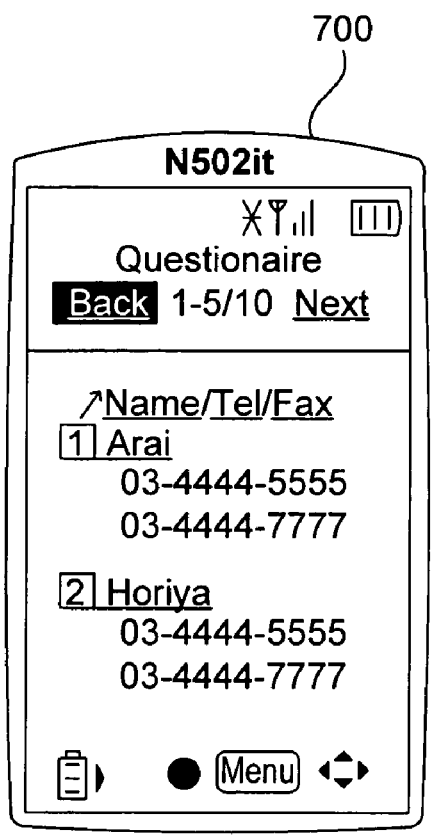
FIGS. 7A-B illustrate list views (or list page view) in accordance with one embodiment of the invention.
Figure 7B:
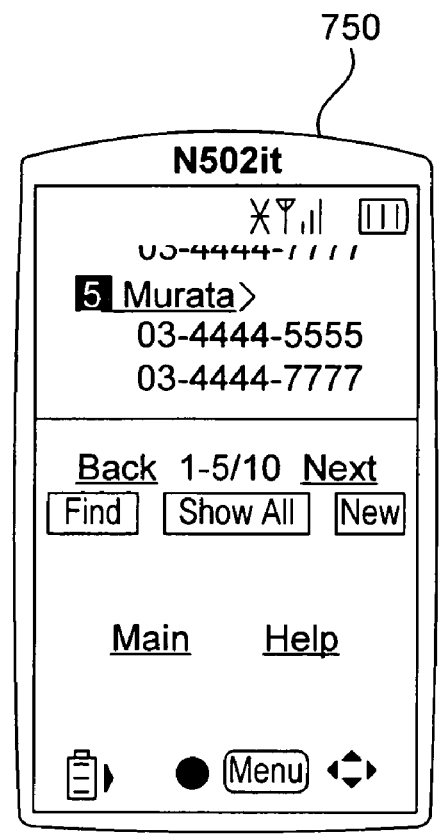

As noted above, a graphical user interface can be implemented for handheld devices which provide a list option view (e.g., the list option 408 of FIG. 4). The list option (or list page) can be used to display the records in a database. Each field value can be, for example, displayed on a separate line. FIGS. 7A-B illustrate list views (or list page view) 700 and 750 in accordance with one embodiment of the invention. The list view 700 displays the first records of a "Questionnaire" database. Each record includes the fields: "Name," "Tel" and "FAX," which respectively represent the name, telephone number and facsimile number of a person or entity. The list view 750 corresponds to a list view display of other records in the Questionnaire database. The list view 750 can be obtained by selecting the "next" function one or more times from the list view 700.

Figure 8A:
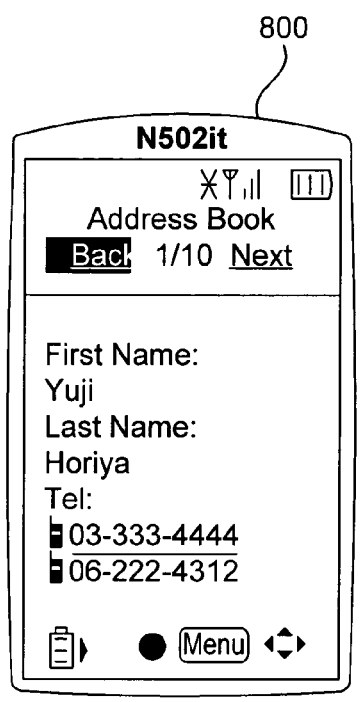
FIGS. 8A-C illustrate form views in accordance with one embodiment of the invention.
Figure 8B:
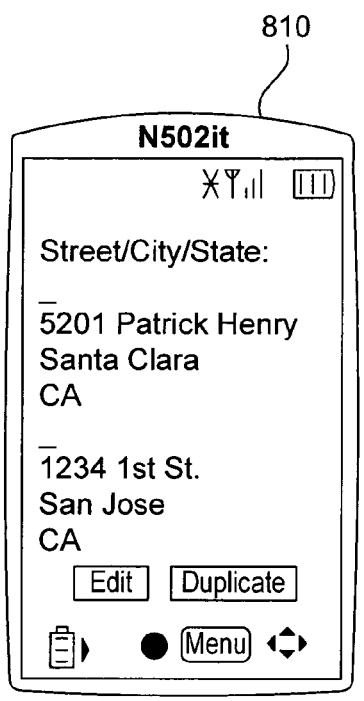
Figure 8C:
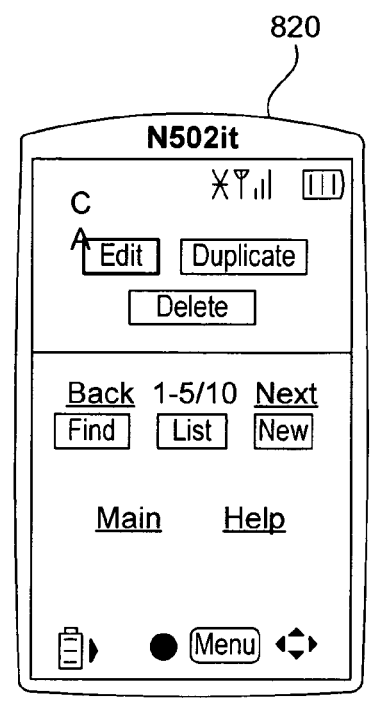

Furthermore, the graphical user interface can provide the user of the handheld device with the ability to view a particular record in the database (e.g., form view option 411 of FIG. 4.) Accordingly, the user can select a particular record from the list displayed in the list option view 700 of FIG. 7A. As a result, the user can be presented with a form view which, among other things, displays the selected record. Furthermore, the form view can provide hypertext links which can conveniently be used by the user of the handheld device. The hypertext links can, for example, represent telephone numbers, email addresses or HTML pages. Accordingly, the user of the handheld device can use the hypertext link to perform a variety of tasks directly from the handheld device without having to switch between different modes, for example, browsing and telephone mode, as required by conventional techniques. This means that the user is able to perform a variety of tasks which are not conventionally possible. For example, the user can initiate a phone call from a remote phone by selecting the appropriate hyperlink which is displayed for the user while the user is accessing a database. To demonstrate, FIGS. 8A-C illustrate form views 800, 810 and 820, respectively, in accordance with one embodiment of the invention. As shown in FIG. 8A, one of the fields of the address book database which represents a telephone number is displayed as a hyperlink. Accordingly, the user is able to initiate a phone call to the particular telephone number by simply selecting the hyperlink.

Figure 9:
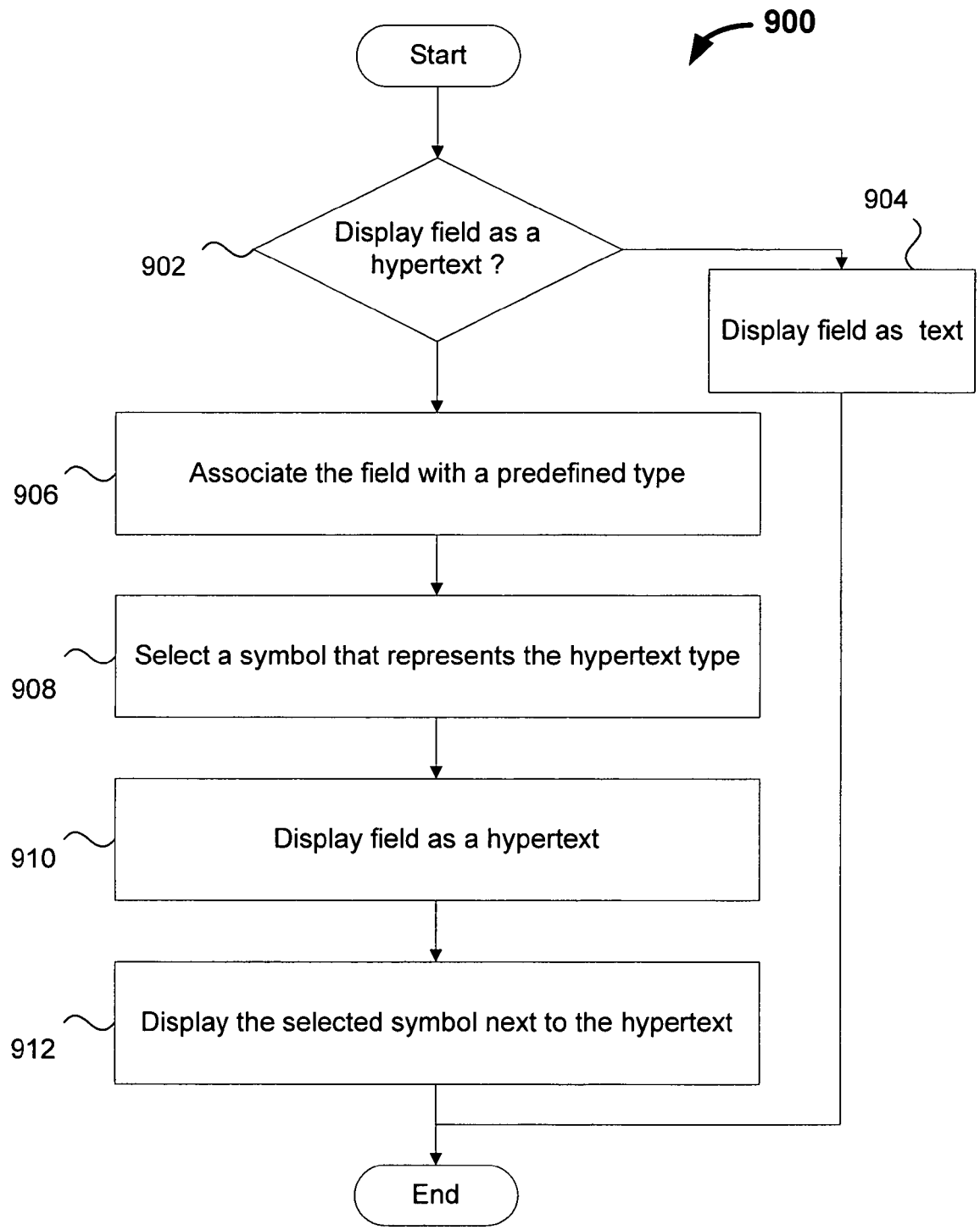
FIG. 9 illustrates a method for displaying fields associated with a record in a database.

FIG. 9 illustrates a method 900 for displaying fields associated with a record in a database. Initially, at operation 902, a determination is made as to whether the field should be displayed as hypertext. If it is determined at operation 902 that the field should not be displayed as hypertext, the method 900 proceeds to operation 904 where the field is displayed as text (i.e., not hypertext). The method 900 ends following operation 904. However, if it is determined at operation 902 that the field should be displayed as hypertext, the method 900 proceeds to operation 906 where the field is associated with a predefined hypertext type. Next, at operation 908, a symbol that represents the hypertext type is selected. Thereafter, at operation 910, the field is displayed as hypertext. Finally, at operation 912, the selected symbol representing the hypertext type is displayed next to the hypertext. The method 900 ends following operation 912.

As will be appreciated by those skilled in the art, the invention can be implemented to provide similar functions as provided by database programs which operate on desktop computers. By way of example, the "find" option 406 of FIG. 4 can be implemented to allow the user to search the records of a database. The find option 406 can also be implemented to allow the user to select one or more comparison operators for one or more search fields. These comparison operators can include, for example: "begins with," "contains," "ends with," "equals", "greater than," "greater than or equal to," "less than," "less than or equal to," "not equal," and the like. In addition, the find option 406 can be implemented to allow the user to specify logical operators (e.g., logical AND, logical OR, etc.).

Similarly, other operations (e.g., edit, delete, duplicate, new, etc.) can provide similar functions as provided by database programs which operate on desktop computers. It should be noted that the invention can be implemented to provide the user with virtually real time access to a database. This means that the user can be provided with information that is up-to-date. By way of example, after a request to create or update a record has been made from a handheld device, the database can be updated immediately to reflect the change. As a result, the users can be provided with up-to-date information.

The invention can use a combination of hardware and software components. The software can be embodied as computer readable code on a computer readable medium. The computer readable medium can be any data storage device that can store data which can thereafter be read by a computer system. Examples of computer readable medium include read-only memory, random-access memory, CD-ROMs, magnetic tape, and optical data storage devices. The computer readable media can also be distributed over a network-coupled computer system so that the code is stored and executed in a distributed fashion.

The advantages of the invention are numerous. Different embodiments or implementations may yield one or more of the following advantages. One advantage of the invention is that database operations can conveniently be performed using a handheld device by interacting with a graphical user interface which is displayed on the handheld device. Another advantage of the invention is that the user can perform various tasks without having to switch between different operational modes. Still another advantage is that the invention can be implemented to operate using existing database programs and conventions. Yet another advantage of the invention is that users of handheld devices can be provided with up-to-date database information.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for allowing a user of a requesting device having a display and a graphical user interface to access a database, comprising:

receiving a database access request from the requesting device;

sending a first list of database access functions to the requesting device when the graphical user interface is operating in a first mode where a first size displayable area is shown in the entire display;

sending a second list of database access functions to the requesting device when the graphical user interface is operating in a second mode where a second size displayable area is shown in a first portion of the display and navigational commands are shown in a second portion of the display, wherein the second size displayable area is smaller than the first size displayable area and wherein the second list is a proper subset of the first list;

receiving a database access function selected by the user from the requesting device;

processing the received database access function; and sending a result of the processed database access function to the requesting device.

2. The method of claim 1, further comprising:

formatting one or more records of the database for presentation on the requesting device such that it can be viewed without having to scroll.

3. The method of claim 1, further comprising:

wherein the second list is selected based upon the maximum amount of database access functions that can be displayed on the requesting device without scrolling.

4. The method of claim 1, wherein the requesting device is a wireless phone;

wherein the result of the processed database access function includes a phone number; and wherein a phone call can be initiated using the wireless phone by selecting the phone number from the result.

5. The method of claim 1, further comprising:

receiving a selection of a database; and wherein the second list of database access functions is selected at least partially based on the selection of the database.

6. A method for allowing a user of a device to access a database in a server computer, comprising:

sending a database access request to the server computer;

in a first operating mode:

receiving a first list of database access functions; and displaying the first list of database action functions in a first displayable area utilizing an entire display;

in a second operating mode:

receiving a second list of database access functions, wherein the second list is a proper subset of the first list;

displaying the second list of database access functions in a second displayable area smaller than the first displayable area; and displaying navigation commands in a third portion of the display;

receiving a selected database access function from the user;

sending the selected database access function to the server computer; and receiving a result of the processed database access function at the device.

7. The method of claim 6, further comprising:

formatting the first list of database access functions for display on a screen of the device without scrolling.

8. The method of claim 7, further comprising:

providing a next and previous button on a graphical user interface to allow the user to transition between pages of database access functions.

9. The method of claim 6, further comprising:

sending a selection of a database to access to the server computer.

10. The method of claim 6, further comprising:

sending a numeric input from the requesting device identifying a database to access.

11. A computer readable medium for storing computer code for allowing a user of a requesting device to access a database, comprising:

executable computer code for receiving a database access request from the user;

executable computer code for sending a first list of database access functions to the requesting device if the requesting device is a non-handheld device;

executable computer code for sending a second list of database access functions to the requesting device if the requesting device is a handheld device, the second list of database access functions being smaller than the first list of database access functions;

executable computer code for receiving a selected database access function from the requesting device;

executable computer code for processing the received database access function; and executable computer code for sending a result of the processed database access function to the requesting device.

12. A computer readable medium as recited in claim 11, wherein the computer readable medium further comprises:

executable computer code for formatting the one or more records of the database for presentation on the requesting device such that it can be viewed without having to scroll.

13. A computer readable medium as recited in claim 11, wherein the handheld device is a wireless phone;

wherein the result of the processed database access function includes a phone number; and wherein a phone call can be initiated using the wireless phone by selecting the phone number from the result.

14. A device having a display, the display having a graphical user interface controlling the display of items on the display, comprising:

memory; and a processor adapted to:

receive a database access request from the requesting device;

send a first list of database access functions to the requesting device when the graphical user interface is operating in a first mode where a first size displayable area is shown in the entire display;

send a second list of database access functions to the requesting device when the graphical user interface is operating in a second mode where a second size displayable area is shown in a first portion of the display and navigation commands are shown in a second portion of the display, wherein the second size displayable area is smaller than the first size displayable area and wherein the second list is a proper subset of the first list;

receiving a database access function selected by the user from the requesting device;

process the received database access function; and send a result of the processed database access function to the requesting device.

15. The first device of claim 14, wherein the device is a mobile phone.

16. The device of claim 14, wherein the processor is further adapted to:

format the first list of database access functions for display on the display of the device without scrolling.

17. The device of claim 14, wherein the processor is further adapted to:

provide a next and previous button on a graphical user interface to allow the user to transition between pages of database access functions.

18. The first device of claim 14, wherein the processor is further adapted to:

send a selection of a database to access to the server computer.

* * * * *

UNITED STATES PATENT AND TRADEMARK OFFICE
CERTIFICATE OF CORRECTION

PATENT NO.      : 7,761,118 B1
APPLICATION NO. : 11/285859
DATED           : July 20, 2010
INVENTOR(S)     : Dirk Kessler et al.

Page 1 of 1

It is certified that error appears in the above-identified patent and that said Letters Patent is hereby corrected as shown below:

On Sheet 3 of 9, in Figure 3, Reference Numeral 312, line 2, delete "appropraite" and insert -- appropriate --, therefor.

Signed and Sealed this
Fifteenth Day of November, 2011

David J. Kappos
*Director of the United States Patent and Trademark Office*